United States Patent Office 3,448,671
Patented June 10, 1969

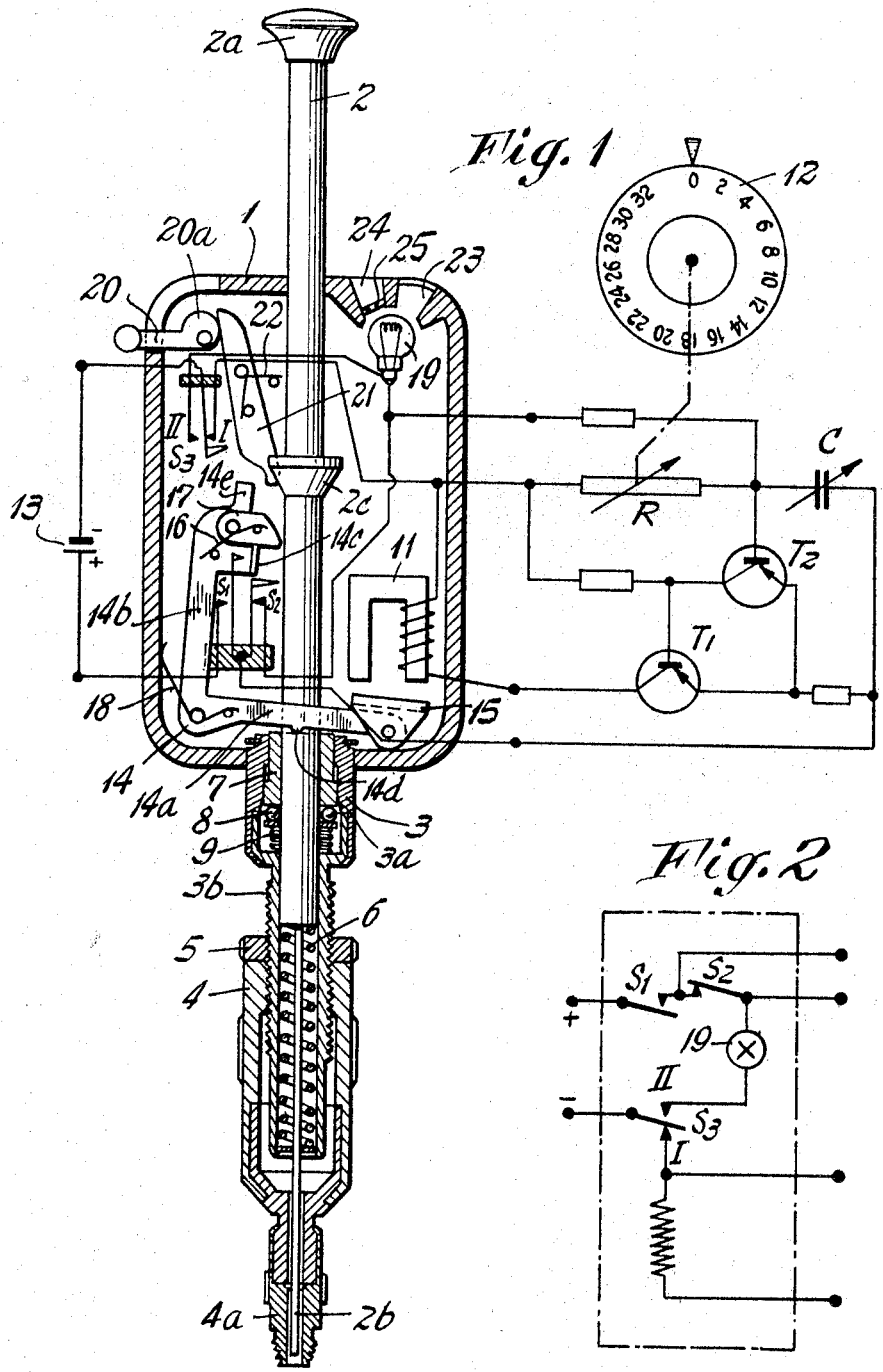

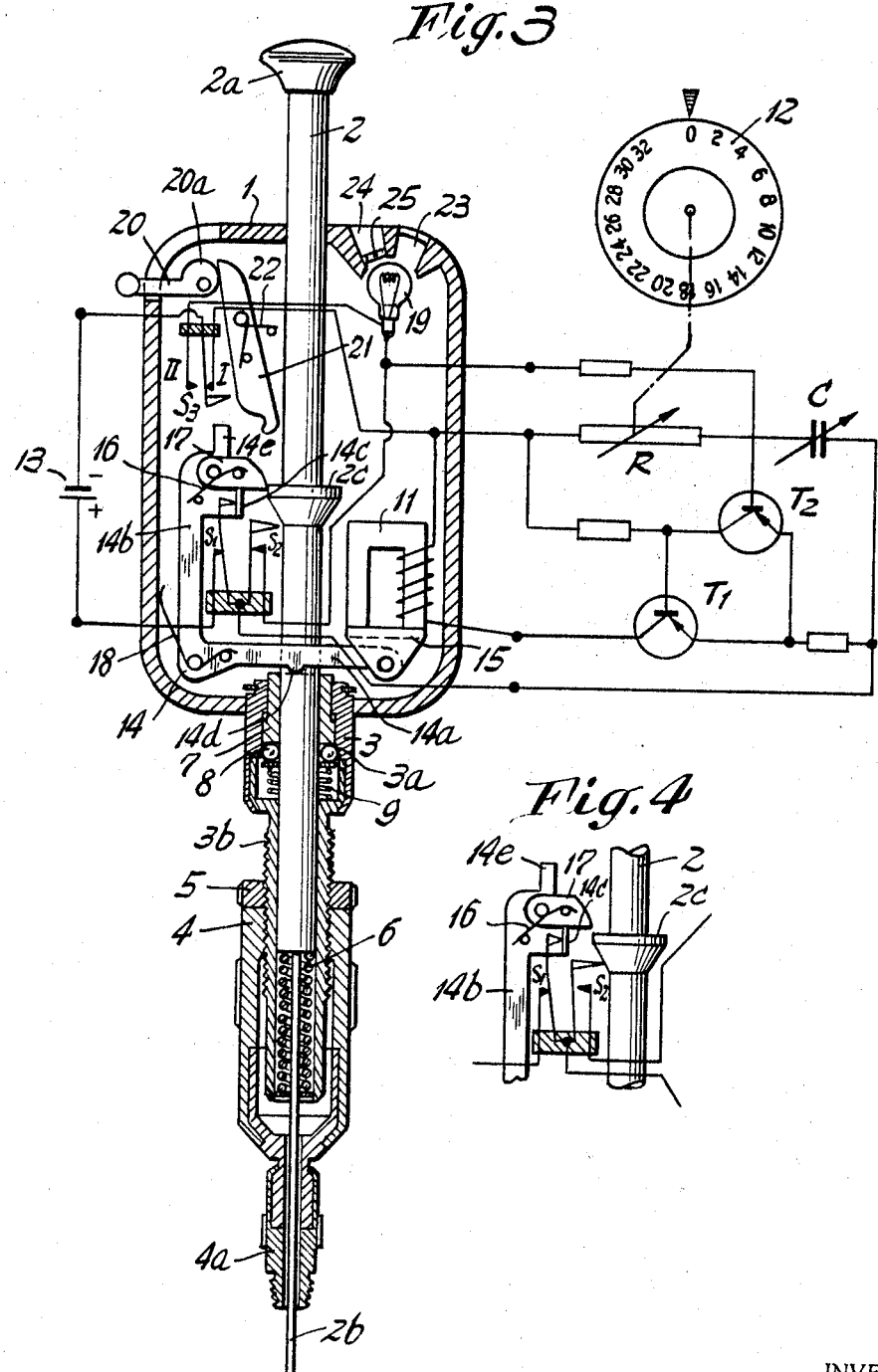

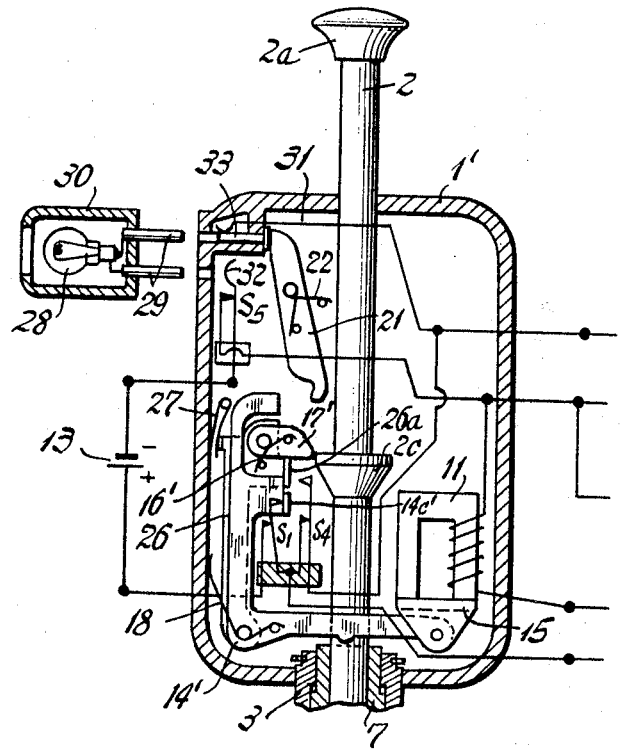

3,448,671
APPARATUS FOR RELEASING A PHOTOGRAPHIC CAMERA AND FOR DETERMINING THE EXPOSURE PERIOD
Waldemar T. Rentschler and Franz W. R. Starp, Calmbach, Black Forest, Germany, assignors to Prontor-Werk Alfred Gauthier G.m.b.H., Calmbach, Black Forest, Germany, a corporation of Germany
Filed Jan. 14, 1966, Ser. No. 520,597
Claims priority, application Germany, Jan. 19, 1965,
G 42,593
Int. Cl. G03b 9/58
U.S. Cl. 95—53                                    12 Claims

ABSTRACT OF THE DISCLOSURE

An apparatus for releasing a photographic camera by means of a release push rod acting on the shutter. The apparatus is provided with a manually settable device for obtaining comparatively long exposure times of different duration. An electronic timing circuit is provided as is an electromagnet connected to the timing circuit. An actuating device cooperates with the release push rod and the electromagnet. A power supply activates the electronic circuit and is connected to the circuit upon actuation of the release push rod. In addition, a locking device is provided which is acted upon by the actuating device after the exposure time set into the apparatus has expired. The locking device maintains the push rod in the release position and enables the push rod to return to the starting position.

---

This invention relates to an apparatus for releasing a photographic camera by means of a release push-rod which acts on the shutter. The apparatus is provided with a manual device for obtaining comparatively long exposure times of different duration, when the camera is set to the "B" position.

Apparatus of these types were, heretofore provided with a manually cockable spring-driven gear associated with a mechanical escapement mechanism for the purpose of obtaining presumably ultra-long exposure times. Such release apparatus are limited with respect to the maximum exposure times that can be obtained, because the energy storage unit cannot be enlarged at will. This is due to the limited space available in the conventional apparatus, and due to the condition that the cocking moment cannot be increased arbitrarily if the operation of the apparatus is to remain simple and convenient.

It is therefore an object of the present invention to produce a release apparatus having a minimum number of structural elements, and permitting operation in a simple manner. It is also an object of this invention to provide the release apparatus with means for generating ultra-long exposure times that are far beyond those obtainable with mechanical arrangements. Such means are to be associated with an indicating device requiring relatively few structural elements and allowing the apparatus to be quickly and dependably adjusted to the specific and given release instant of the camera.

The present invention solves this problem essentially by providing that the preceding means include a commonly known electronic circuit which controls a holding magnet. An actuating device which co-operates with the release push-rod and with the holding magnet is also included. The operation is such that, upon actuation of the release push-rod, the circuit is connected to a battery. After the exposure time that was set into the apparatus has expired, the actuating device acts on a locking member holding the push-rod in the release position, so as to return the latter to the starting position. This design has made it possible to produce with comparatively simple elements a release apparatus which is simple to operate. The design also allows the carrying out of exposures with substantially longer durations than those possible with apparatus using mechanical means for timing control. The use of an electronic circuit for generating the exposure time has, moreover, the feature that the setting disc maintains its set position during the course of the exposure, and in this manner the selected exposure time can be read at any time during the exposure period. The selected exposure remains set even after the exposure has expired, and until the setting is intentionally changed. Moreover, in the release apparatus of the invention, the cocking of the timing gear is dispensed with, and in this way the apparatus is easier to handle and ready for action more rapidly.

The invention possesses a feature particularly advantageous to the functioning of the release apparatus. The actuating device acted upon by the eletcronic circuit, includes an angle lever which carries, at one end, an armature associated with the holding magnet. A spring-loaded pawl is associated with the other end of the angle lever. The pawl is situated in the path of motion of a shoulder provided on the push-rod. When the push-rod is actuated, the angle lever is moved out of its starting position, and against the action of a spring. The armature thereby engages the holding magnet and the main switch is closed. The pawl becomes disengaged from the shoulder when the camera shutter is released.

This arrangement allows various configurations for the actuating device. For example, in another embodiment of the invention, the pawl may be situated on an arm of the angle lever, and a contact switch for the RC-circuit may be located within the path of motion of the shoulder of the push-rod. The contact switch is also opened when the camera shutter is released.

It is desirable to have simple means by which the timing of the RC-circuit begins at the very moment that the pawl associated with the angle lever, is disengaged from the shoulder of the push-rod. Accordingly the invention also provides that the pawl be arranged on an actuating lever tensionally connected to the angle lever. A contact switch associated with the RC-circuit, is situated within the path of motion of the actuating lever. The contact switch is opened by the actuating lever when the pawl slides off the shoulder of the push-rod.

For purposes of adjusting the apparatus to the release instant of the camera shutter, the invention provides an indicating lamp which can be operated by the contact switch associated with the RC-circuit. The lamp can be connected to the battery of the electronic circuit for purposes of adjusting the apparatus and determining the charge of the battery. This design permits the photographer to make the release apparatus coincide, with the specific release instant of the camera shutter, in a simple, quick, and dependable manner.

In order to allow for flexibility in construction of the timing and indicating devices, the invention possesses the feature that the angle lever is associated with an intermediate lever which permits closing of the main switch when the indicating lamp is being connected to the battery.

A particularly favorable arrangement and mode of operation of the indicating device may be obtained with the lamp situated within the housing of the apparatus. For the purpose of connecting the lamp to the battery, the intermediate lever is associated, at one end, with the lamp situated within the housing of the apparatus. intermediate lever is associated with a switch which can be connected to either the electronic circuit or the indicating lamp through means of the reversing lever.

In order to avoid the requirement for removing the burned out lamp from the housing of the apparatus, an embodiment of the invention provides that the indicating lamp be situated within a housing of its own. The latter is plugged into the main housing of the apparatus, and causes the indicating lamp to be automatically connected to the battery, and the electronic timing circuit to be disconnected from the battery.

The invention possesses a still further feature of two observation openings associated with the housing enclosing the indicating lamp. One of these observation openings is provided with a gray filter of specific density. The other opening is with a glass that transmits freely the light of the indicating lamp. With this arrangement it is possible to determine whether the battery is sufficiently charged to assure proper operation of the electronic timing circuit.

Two embodiments of the invention as well as other features and advantages are described in the following specification taken in conjunction with the accompanying drawing in which—

FIG. 1 shows a longitudinal section of the apparatus in the starting position. An electric indicating device is built into the housing, for adjustment and control purposes. The electronic circuit is illustrated diagrammatically outside of the apparatus housing.

FIG. 2 is a diagrammatic view of the circuit of the electrical indicating device, corresponding to the position of the apparatus as illustrated in FIG. 1.

FIG. 3 shows the apparatus shortly before the release of the camera shutter. The diagrammatic representation is similar to that of FIG. 1.

FIG. 4 shows a portion of the apparatus after the camera shutter has been released.

FIG. 5 shows a portion of the apparatus with another way to actuate the contact switch for the RC-circuit, as well as to arrange the indicating lamp provided for purposes of adjustment and control.

FIG. 6 shows the wiring diagram for the indicating lamp when arranged as shown in FIG. 5.

In accordance with the drawing, a release push-rod 2 may be moved relative to the housing 1 of an apparatus for obtaining comparatively long exposure times. The release push-rod 2 is provided at one end with a button 2a, and at the other end with a pin 2b. The release push-rod 2 is guided in a sleeve 3 including an inner cone 3a and an external thread 3b. As illustrated in FIGURES 1 and 3, the lower end of pin 2b may slide within a screwed on nipple 4a of a threaded sleeve 4 which can be screwed onto the sleeve 3. A lock-nut 5 is provided for securing the threaded sleeve 4 in place.

Instead of the threaded sleeve 4, a cable release member may have a nipple similar to nipple 4a, and pin 2b may act on the pin of the cable release member. The release push-rod 2 is held in the starting position shown in FIG. 1, by means of a return or restoring spring 6.

Arresting of release push-rod 2 in the release position of FIG. 4, is accomplished by a locking device commonly known and having an unlocking sleeve 7, as well as a number of balls 8. The balls engage the displaceable unlocking sleeve due to the action of a compression spring 9. The locking device designed so that the balls 8 allow the release push-rod 2 to be depressed, but prevent the latter's return to the starting position because it becomes wedged in the inner cone 3a. Return to the starting position does not occur until the wedging effect is offset by pressure on sleeve 7 to counteract compression spring 9.

An actuating device is provided for releasing the locking device. This actuating device cooperates at one end with an electronic timing circuit, and at the other end with release push-rod 2. The timing circuit may consist of the commonly known monostable multivibrator circuit including a transistor T1 and a holding magnet 11 connected in series with the transistor. A variable capacitor C connected to a second transistor T2, and a variable resistor R are also provided in the circuit. Resistor R and the capacitor C form the retarding mechanism corresponding to the exposure time.

The exposure time can be preselected by means of a setting disc 12 positioned in the housing 1. For purpose of clarity, the drawing shows this disc externally to the housing. As shown in FIGURES 1 and 3, the ohmic value of variable resistor R can be set in accordance with the desired exposure time, by means of setting disc 12. The exposure time may also be set by coupling disc 12 to the variable capacitor C, or to both resistor R and capacitor C.

To activate the electronic circuit, a battery or power supply 13 is used. The power supply can be connected to the circuit through a main switch S1 which can be closed by the actuating device upon depression of release push-rod 2. In accordance with the arrangement illustrated in FIGS. 1 to 4, the actuating device includes an angle lever 14. One arm 14a of this lever carries an armature 15 associated with holding magnet 11. A deflecting pawl 17 engaging a bent-up lug 14c due to spring 16, is articuately connected to the other arm 14b. By means of a lug 14d provided on arm 14a, the angle lever 14 acted on by spring 18, is able to act on sleeve 7 when the holding magnet 11 is deenergized. This causes the ball locking device to become released.

A conical shoulder 2c is provided on release push-rod 2 for purposes of acting on angle lever 14. Upon actuation of the release push-rod, pawl 17 moves up conical shoulder 2c. The angle lever is thereby rotated counterclockwise, and main switch S1 is closed by the bent-up lug 14c. Associated with main switch S1 is a contact switch S2 which can be actuated by the conical shoulder 2c. Switch S2 is closed in the starting position of the apparatus, and thus short-circuits capacitor C. The switch is opened upon actuation of the release push-rod, and at the moment that the camera shutter is released.

The release apparatus is also provided with an indicating device which enables the photographer to synchronize the opening of contact switch S2 with the instant of release of the camera shutter. This device includes an indicating lamp 19 situated in the housing 1. The lamp can be connected, on the one hand, to the contact switch S2 and, on the other hand, to the battery 13 by means of a transfer switch S3. The invention provides, for this purpose, a manually operable reversing lever 20 with an eccentric 20a. The eccentric is engaged by one end of an intermediate lever 21 due to the action of spring 22. The other end of lever 21 can be brought into engagement with lug 14e arranged on angle lever 14, when reversing lever 20 is actuated. Switch S3 is thereby transferred from contact position I corresponding to the electronic circuit, to contact position II corresponding to the indicating lamp 19. The main switch S1 is simultaneously closed. An observation opening 23 enclosed by ordinary glass, is provided in the housing 1 to allow a view at the indicating lamp 19.

It is possible to use indicating lamp 19 for purposes other than adjustment of the ultra-speed release apparatus. Thus, it may also be used for determining the state of battery 13. For this purpose, another opening 24 penetrates the housing 1. A gray filter 25 is situated within the opening. The density of the filter is selected so that the light of the indicating lamp 19 can be perceived only if the battery voltage has not dropped below a given lower limit as, for example, 50 to 60% of the fully charged battery voltage. Above this limit, proper operation of the circuit is assured. Since external light may act in an interfering manner when looking at the indicating lamp 19, it is advisable to blacken the inner walls of the two observation openings 23 and 24. The indicating lamp 19 may also be used, if desired, for illuminating the setting members of the camera, when in a dark environment.

The release apparatus described above and illustrated in FIGS. 1 to 4 may be operated in the following manner:

Upon actuation of release push-rod 2, the angle lever 14 is moved from the starting position shown in FIG. 1, against the action of the spring 18, and into the position of FIG. 3. This results because conical shoulder 2c rides up pawl 17. The main switch S1 is thereby closed, and transistor T1 becomes conductive. The holding magnet 11 is thus energized. At the same time, armature 15 engages holding magnet 11, and the angle lever 14 is thereby held in the position of FIG. 3. The ball locking device is also released for locking action.

Upon further depression of the release rod 2, the pawl 17 is disengaged from the conical shoulder 2c, as shown in FIG. 4. The camera shutter previously set at "B" is released, and contact switch S2 is opened by shoulder 2c. The push-rod 2 is held in the release position by the ball locking device. As switch S2 begins to open, capacitor C starts to charge. The duration of the charging time corresponds to the exposure time preselected with the setting disc 12. After the preset time has expired, the capacitor C has reached the base potential of the transistor T2. The latter becomes thereby conductive, while transistor T1 becomes cut off. The holding magnet 11 is thus de-energized, and angle lever 14 is able to return to the starting position shown in FIG. 1, due to the action of spring 18. This releases the ball locking device because lug 14d impinges on sleeve 7. Accordingly, the release rod 2 is returned to the starting position due to the action of the restoring spring 6. The pawl 17 is now deflected upward against the force of spring 16.

In order to set the release apparatus at the given release instant of the camera, reversing lever 20 can be pivoted clockwise from the starting position shown in FIG. 1. Intermediate lever 21 is thereby moved in the same direction of rotation, and against the action of spring 22. The transfer switch S3 is thus moved from position I shown in FIG. 1 to position II in which the power supply 13 is disconnected from the electronic circuit and connected to indicating lamp 19. At the same time, intermediate lever 21 causes angle lever 14 to transfer from its starting position to the one shown in FIG. 3. Switch S1 thereby moves into contact position, and this causes indicating lamp 19 to light up because contact switch S2 is in the closed position.

Upon actuation of release rod 2, switch S2 is opened by the conical shoulder 2c, and this disconnects the indicating lamp 19. In order to obtain an exposure corresponding to the preset exposure time, the disconnecting of the indicating lamp 19 should coincide as closely as possible, with the release of the camera shutter by push-rod 2. In order to obtain this result, the photographer has to merely screw the threaded sleeve 4 further onto or off sleeve 3, and then retighten the lock-nut 5.

In order to determine the degree of charge of battery 13, the indicating lamp 19 is also switched on by actuating the reversing lever 20. Provided that the light of lamp 19 can be seen through the gray filter 25, battery 13 may be assumed sufficiently charged for obtaining proper exposure results. If, on the other hand, lamp 19 can be seen only through opening 23, the battery may be assumed to have fallen below the lower limit and, consequently, useful exposure results can no longer be expected. If no light at all can be perceived through the opening, the photographer must conclude that either lamp 19 has burned out or battery 13 has no further charge.

In the embodiment of FIGS. 5 and 6, an angle lever 14' acted on by spring 18, is positioned in a housing 1' similar to the arrangement described above. In contrast to the embodiment shown in FIGURES 1 to 4, angle lever 14' cooperates indirectly with the release rod 2. An actuating lever 26 is situated coaxially with angle lever 14', and carries pawl 17' which engages a lug 26a due to the action of spring 16'. In the starting position, actuating lever 26 bears against the shank of release rod 2 through pawl 17', due to spring 27. When push-rod 2 is actuated, lever 26 engages angle lever 14' by means of the lug 26a. The angle lever 14' has, in turn, a lug 14c' for actuating the main switch S1.

Associated with lug 26a is also a contact switch S4 corresponding to RC-circuit. When the apparatus is in the starting position, switch S4 is held open by lug 26a. This switch closes automatically when the release rod 2 is actuated, but opens again in the final phase of the release process. In order to adjust the release mechanism in relation to the release instant of the camera shutter, the arrangement of FIGURES 5 and 6 also provides for an indicating lamp 28 situated in its own housing 30. Two terminals 29 project from the housing. Associated with terminals 29 in housing 1', are two contact blades 31 and 32. One of these (31) is connected to the contact switch S4. The other contact blade is a component part of switch S5 connected to the negative terminal of battery 13. Switch S5 connects the electronic circuit to the battery when housing 30 is removed. Associated with angle lever 14', is the intermediate lever 21. Due to the action of the spring 22, lever 21 bears against an insulated pin 33 guided within the housing.

In the starting position (not shown) of the apparatus, angle lever 14' occupies the same position as the lever 14 in FIG. 1, and actuating lever 26 bears against release rod 2. Switches S1 and S4 are thus open. Upon depression of the release push-rod, the actuating lever and angle lever are moved into the position shown in FIG. 5. Switches S1 and S4 are now closed, and armature 15 engages the holding magnet 11. The closing of main switch S1 causes angle lever 14' to be held in the position of FIG. 5. In the final phase of the downward motion of release rod 2, the camera shutter is released and pawl 17' is disengaged from shoulder 2c. Actuating lever 26 thereby opens again switch S4 corresponding to the RC-circuit, due to the action of the spring 27. After the functional period of the electronic circuit described above in connection with FIGURES 1 to 4, has expired, the holding magnet 11 is de-energized. Angle lever 14' can thus be transferred into the starting position, due to the action of the spring 18. This allows release rod 2 to return to its normal position through release of the ball locking device. As soon as the two levers 14' and 26 have reached the starting position, switches S1 and S4 are re-opened, and this disconnects the electronic timing circuit automatically from the battery, and immediately after the exposure time has expired.

In order to set the release mechanism of FIG. 5 to the release instant of the camera shutter, indicating lamp 28 with terminals 29 is inserted into housing 1'. One terminal engages thereby the contact blade 31, and the other terminal impinges on contact blade 32 of switch S5. This opens the switch, and the electronic circuit is disconnected from the battery 13. At the same time, insulated pin 33 and intermediate lever 21 cause angle lever 14' to be rotated in counterclockwise direction, thereby closing switch S1. However, indicating lamp 28 does not, as yet, light up, because switch S4 is still held open by actuating lever 26. Only when pawl 17' rides up the conical shoulder 2c, does switch S4 become closed. This occurs when release rod 2 is depressed, and actuating lever 26 is moved against spring 27. If push-rod 2 is pressed further downward from the intermediate position shown in FIG. 5, pawl 17' is disengaged from shoulder 2c, and actuating lever 26 opens the contact switch S4 due to the action of the spring 27. In this manner, indicating lamp 28 does not continue to light. In order to assure proper operation of the release mechanism, the light should go out, as closely as possible at the instant of release of the camera shutter. This result can be achieved by screwing or unscrewing the threaded sleeve 4, as described for the arrangement of FIGURES 1 to 4.

The component parts of the electronic circuit shown externally to the housing 1 or 1' in the drawing, disc 12, and battery 13, can all be situated within this housing. However, it is also possible to locate these elements in a separate housing, and to connect the two housing units together by means of electrical cables.

What is claimed is:

1. An apparatus for releasing a photographic camera by means of a release push-rod acting on the shutter, said apparatus being provided with a manually settable device for obtaining comparatively long exposure times of different duration, and being characterized by: an electronic timing circuit; an electro magnet connected to said timing circuit and controlled thereby; an actuating device co-operating with said release push-rod and said electro-magnet; a power supply for activating said electronic circuit and being connected to said circuit upon actuation of said release push-rod; and a locking device operative to maintain said push-rod in a position in which the shutter is released, said locking device being acted upon and made inoperative by said acting device after the exposure time set into the apparatus has expired so that said push-rod is able to return to the starting position.

2. The apparatus of claim 1 wherein said actuating device comprises: an angle lever carrying an armature associated with said electromagnet; a spring-loaded pawl associated with said angle lever and situated within the path of motion of a shoulder located on said release push-rod; a spring; and a first switch closed upon said push-rod being actuated, said angle lever, being moved out of its starting position against the action of said spring, and said armature engaging said electromagnet.

3. The apparatus of claim 2 wherein said pawl is situated on an arm of said angle lever a second switch is associated with said timing circuit and is situated within the path of said shoulder of said release rod, said second switch being opened when the camera shutter is released.

4. The apparatus of claim 2 wherein said pawl is situated on an actuating lever tensionally coupled to said angle lever, and a third switch is situated within the path of said actuating lever, said third switch being associated with said timing circuit and being opened by said actuating lever when said pawl slides off said shoulder of said release rod.

5. The apparatus of claim 2 wherein an indicating lamp is connectable to said power supply in form of a battery for adjusting said apparatus, and determining the charge of said battery.

6. The apparatus of claim 5 wherein said angle lever is associated with an intermediate lever for allowing said angle lever to move into the position for actuating said first switch when said indicating lamp is being connected to said battery.

7. The apparatus of claim 6 wherein said indicating lamp is situated within the housing of said apparatus, a manual reversing lever is associated with said intermediate lever for connecting said lamp to said battery, and a transfer switch is associated with said intermediate lever for connecting to either said electronic timing circuit or said indicating lamp.

8. The apparatus of claim 5 wherein said indicating lamp is located within a separate housing pluggable into the housing of said apparatus, said battery being automatically connected to said indicating lamp and disconnected from said timing circuit when said separate housing is plugged into the housing of said apparatus.

9. The apparatus of claim 5 wherein said indicating lamp is associated with two observation openings, penetrating the housing containing said lamp, one of said observation openings including a gray filter and the other one of said openings including transparent means for transmitting freely the light of said lamp.

10. An apparatus for releasing a photographic camera by means of a release push rod acting on the shutter, said apparatus being provided with a manually settable device for obtaining comparatively long exposure times of different duration, and being characterized by: a locking device for holding said push-rod in a position in which the shutter is released; an actuating device transferring said locking device into an inoperative position after the exposure time inserted into said apparatus has expired so that said push-rod may return to the starting position; an electronic timing circuit corresponding to the exposure time; a battery connectable to said circuit; and an electromagnet associated with said timing circuit and cooperating with said actuating device, said timing circuit being connected to said battery upon actuation of said release push-rod.

11. An apparatus for releasing a photographic camera by means of a release push-rod acting on the shutter, said apparatus being provided with a manually settable device for obtaining comparatively long exposure times of different duration, and being characterized by: a spring loaded pawl situated within the path of motion of a shoulder cam fixed to said push-rod; an electromagnet; an armature associated with said magnet; an angle lever carrying said armature and being associated with said pawl, said angle lever being moved out of its starting position against the action of a spring upon actuation of said push-rod, and causing said armature to engage said electromagnet; an electronic timing circuit for operating said electromagnet; a battery to activate said circuit upon actuation of said push-rod; and a locking device for holding said push-rod in the release position until the expiration of the exposure time when said push-rod returns to the starting position.

12. An apparatus for releasing a photographic camera by means of a release push rod acting on the shutter, said apparatus being provided with a manually settable device for obtaining comparatively long exposure times of different duration, and being characterized by: an indicating lamp; a timing circuit; a battery associated with said circuit, said battery being connectable to said indicating lamp for determining the charge of said battery; an electromagnet operable by said circuit; a locking device to maintain said push rod in a position in which the shutter is released until after the exposure time set into the apparatus has expired; and an actuating member which comes to rest against said electromagnet against spring force when said push-rod is actuated, said actuating member being held by said electromagnet for the duration of the exposure time, said circuit being connected to said battery upon actuating of said push-rod.

References Cited
UNITED STATES PATENTS 3,187,653   6/1965   Rentschler _____ 95—53

JOHN M. HORAN, *Primary Examiner.*